(12) United States Patent
Brighenti et al.

(10) Patent No.: US 8,260,491 B2
(45) Date of Patent: Sep. 4, 2012

(54) ROAD VEHICLE DRIVER BEHAVIOUR ANALYSIS METHOD

(75) Inventors: Attilio Brighenti, Venezia (IT); Jacopo Biancat, Venezia (IT)

(73) Assignee: Systems and Advances Technologoes Engineering S.r.l., Venezia (IT)

(*) Notice: Subject to any disclaimer, the term of this patent is extended or adjusted under 35 U.S.C. 154(b) by 116 days.

(21) Appl. No.: 12/847,229

(22) Filed: Jul. 30, 2010

(65) Prior Publication Data
US 2011/0029184 A1 Feb. 3, 2011

(30) Foreign Application Priority Data

Jul. 31, 2009 (IT) .............................. BO2009A0514

(51) Int. Cl.
*G01M 17/00* (2006.01)

(52) U.S. Cl. ...................................... 701/34.1
(58) Field of Classification Search ................ 701/29.1, 701/34.1, 53, 58, 65
See application file for complete search history.

(56) References Cited

U.S. PATENT DOCUMENTS
5,832,400 A * 11/1998 Takahashi et al. ............. 701/53

FOREIGN PATENT DOCUMENTS
EP 1158273 11/2001
WO WO 2008/127465 10/2008

OTHER PUBLICATIONS
Italian Search Report dated Mar. 30, 2010.
* cited by examiner

*Primary Examiner* — Kim T Nguyen
(74) *Attorney, Agent, or Firm* — McCarter & English, LLP

(57) ABSTRACT

A road vehicle (1) driver behavior analysis method, the analysis method including the steps of determining and memorizing the instantaneous position of the vehicle (1) expressed in geographic coordinates; determining and memorizing at least one dynamic characteristic characterizing motion of the vehicle (1); classifying a current road section just travelled by the vehicle (1); determining the space-dependent pattern of the dynamic characteristic along the current road section; determining a deviation between the space-dependent pattern of the dynamic characteristic along the current road section, and a space-dependent mean pattern or statistical distribution of the dynamic characteristic along the same or a similar road section and determined in previous runs of the vehicle (1); and identifying anomalous driver behavior if the absolute value of the deviation is above a given threshold.

14 Claims, 7 Drawing Sheets

ROAD VEHICLE DRIVER BEHAVIOUR ANALYSIS METHOD

TECHNICAL FIELD

The present invention relates to a road vehicle driver behaviour analysis method.

BACKGROUND ART

Driver distraction, indecision, and high speed are the major causes of road vehicle accidents.

Modern road vehicles are equipped with numerous electronic controls which exchange information over an on-board BUS type data network known as a CAN (Car Area Network), which is supplied with the main dynamic data of the vehicle (i.e. longitudinal speed, individual wheel rotation speed, and longitudinal and lateral acceleration) and the commands imparted by the driver (i.e. steering angle, brake pressure, throttle position, engaged gear). An increasing number of vehicles are also equipped with a GPS receiver, which provides a fairly accurate, real-time georeference location of the vehicle.

Various methods of determining road vehicle driver behaviour have been proposed based on statistical algorithms, which determine anomalous driving behaviour solely on the basis of signals supplied by the above data networks on the vehicle. The driver is often alerted to these anomalies by acoustic and/or visual warnings to correct a potentially dangerous driving mode. The symptoms of anomalous driving behaviour are related to the commands imparted by the driver to the vehicle, and to the kinematic response of the vehicle to them (e.g. anomalous speed and/or acceleration), but this information can very easily be confused with anomalous traffic situations, and as such is of limited effectiveness and scope.

Other methods have also been proposed, which employ the instantaneous position of the vehicle on a georeference map stored in a database. A georeference map, however, poses several problems by having to be constantly updated, and by inevitably involving errors which may even seriously affect driver behaviour analysis.

Patent Application WO2008127465A1 describes a real-time, dangerous-driving prediction method which processes dynamic vehicle parameters, physiological driver data, and driver behaviour characteristics using an automatic-learning algorithm. More specifically, the method is based on algorithms which classify dangerous driving situations, such as a sharp bend, sudden acceleration/deceleration, erratic steering, etc., but fails to identify dangerous situations not taken into account at the algorithm learning stage. Moreover, this method, too, is not fully dependable in all driving situations, and may therefore mistake normal for dangerous behaviour, and vice versa.

What the state of the art does not take sufficiently into account is the extent to which anomalous-driving indicators depend on the motoring context. That is, no known method provides for a georeference (i.e. spatial location) of the dynamic vehicle signals or driver control signals used to determine driver behaviour.

DESCRIPTION OF THE INVENTION

It is an object of the present invention to provide a road vehicle driver behaviour analysis method designed to eliminate the above drawbacks, and which at the same time is cheap and easy to implement.

According to the present invention, there is provided a road vehicle driver behaviour analysis method as claimed in the attached Claims.

BRIEF DESCRIPTION OF THE DRAWINGS

A non-limiting embodiment of the present invention will be described by way of example with reference to the accompanying drawings, in which.

PREFERRED EMBODIMENTS OF THE INVENTION

Figure 1:
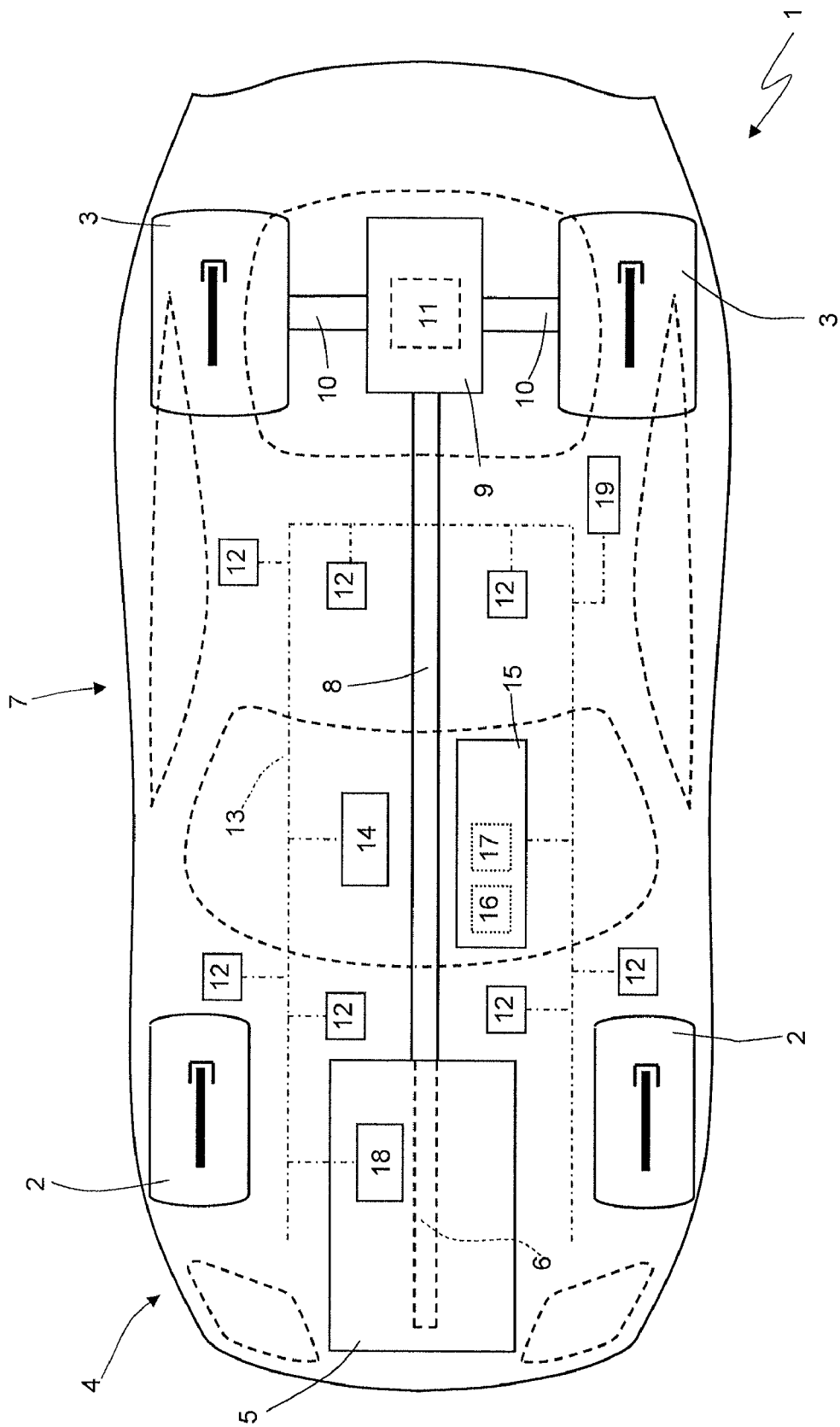
FIG. 1 shows a schematic of a road vehicle implementing the driver behaviour analysis method according to the present invention.

Number 1 in FIG. 1 indicates as a whole a road vehicle comprising two front wheels 2; and two rear drive wheels 3 powered by a power train 4. Power train 4 comprises a front internal combustion engine 5 with a drive shaft 6; and an automatic manual transmission 7 (known as "AMT") for transmitting power from internal combustion engine 5 to rear drive wheels 3. Transmission 7 comprises a propeller shaft 8 angularly integral with drive shaft 6 at one end, and connected mechanically at the other end to a rear gearbox 9, which transmits power to rear drive wheels 3 by two axle shafts 10 powered by a differential 11.

Vehicle 1 comprises a number of sensors 12 for detecting the real-time values of a number of dynamic characteristics of vehicle 1, such as the steering angle, steering angle change rate, yaw angle, yaw angle change rate, lateral acceleration, longitudinal acceleration, speed, individual rotation speed of wheels 2 and 3, and the hydraulic pressure of the brake circuit of vehicle 1; and the real-time dynamic characteristic values acquired by sensors 12 are supplied to an on-board BUS type data network 13 known as a CAN (Car Area Network).

Vehicle 1 also comprises a global positioning device 14 for determining the real-time instantaneous position of vehicle 1, which is expressed in geographic coordinates (i.e. a latitude value and longitude value), and is also supplied to on-board data network 13.

Vehicle 1 also comprises a driver behaviour analysis unit 15 connected to on-board data network 13 to monitor the dynamic characteristics and the instantaneous position of vehicle 1. Alternatively, analysis unit 15 may be connected directly to global positioning device 14 (over a wire or wireless, e.g. USB or Bluetooth, connection) to receive the instantaneous position of vehicle 1 directly.

As described in detail below, analysis unit 15 uses the dynamic characteristics and the instantaneous position of vehicle 1 to determine anomalous behaviour of the driver of vehicle 1. Once determined, any anomalous behaviour may be signalled to the driver and/or stored in a non-volatile memory forming part of analysis unit 15, and which acts as a sort of "black box" to assist accident investigation by police and/or fleet owners (typically, when vehicle 1 forms part of a fleet of public passenger transport or freight vehicles).

The following is a description of the driver behaviour analysis method implemented by analysis unit 15 to determine anomalous behaviour of the driver of vehicle 1.

From on-board data network (CAN) 13, analysis unit 15 reads the dynamic characteristics of vehicle 1 (i.e. relating to the movement of vehicle 1 and/or the commands imparted to vehicle 1 by the driver) and the instantaneous position of vehicle 1, and stores this data in a buffer memory 16 of its own, which thus contains data relative to the current (i.e. last) road section travelled by vehicle 1. It is important to note that the current road section stored in buffer memory 16 is identified by at least a start point and an end point with respective geographic coordinates. In one embodiment, the current road section stored in buffer memory 16 is also identified by an intermediate point calculated as the geometric barycentre of the start and end points only, or of all the points between the start and end points, of the current road section. The data stored in buffer memory 16 (particularly the dynamic characteristics of vehicle 1) may be pre-filtered (e.g. low-pass filtered to eliminate high-frequency noise) and/or offset corrected.

From the various dynamic characteristics of vehicle 1, at least one directional dynamic characteristic related to the direction (path) of vehicle 1 is identified to accurately determine the type of road section travelled by vehicle 1, i.e. a bend (possibly distinguishing between a wide bend and a tight bend) or a straight road section (also possibly distinguishing between a straight road section travelled in one lane with no overtaking, and a straight road section travelled in different lanes with the possibility of changing lanes and overtaking). Possible directional dynamic characteristics of vehicle 1 are the steering angle, yaw angle, and lateral acceleration. To simplify calculation, some situations need only consider the steering angle, which is the most significant directional dynamic characteristic; whereas others (as, for example, when travelling at high speed around a wide bend) must also take into account the lateral acceleration of vehicle 1.

Analysis unit 15 analyses the pattern of the directional dynamic characteristic (or characteristics, if a number of dynamic characteristics are analysed simultaneously) of the current road section stored in buffer memory 16, and accordingly classifies the current road section, i.e. as a straight road section or bend (possibly distinguishing between a wide bend or a tight bend). More specifically, the current road section is classified as straight, if the directional dynamic characteristic, typically the steering angle, remains close to zero (i.e. below a given threshold in absolute value) along the whole of the current road section, and is classified as a bend, if the directional dynamic characteristic, typically the steering angle, remains above a given threshold in absolute value along the whole of the current road section.

Preferably, the current road section must be of sufficient length, and is only classified if the absolute value of the directional dynamic characteristic is maintained within a given range for a travelled space above a given threshold (e.g. at least 15 metres). Otherwise, the current road section is eliminated from buffer memory 16 with no further analysis, on the grounds that it is not sufficiently stable to determine the behaviour of the driver of vehicle 1.

Once classified as described above, the current road section is analysed by analysis unit 15 to determine the space-dependent pattern of each dynamic characteristic along and from the start point to the end point of the current road section. In buffer memory 16, the instantaneous position of vehicle 1 is stored as a function of time (i.e. is expressed by time-dependent geographic coordinates), and the dynamic characteristics are also stored as a function of time, so analysis unit 15 converts each space-dependent dynamic characteristic by combining the time-dependent dynamic characteristic with the time-dependent instantaneous position of vehicle 1 expressed in geographic coordinates. In one embodiment, for greater precision, the time-dependent instantaneous position of vehicle 1 expressed by geographic coordinates may be obtained by combining the position of vehicle 1 indicated by global positioning device 14, with the position of vehicle 1 obtained by mathematically integrating the longitudinal and lateral acceleration and/or yaw speed and rotation speed of wheels 2 and 3 of vehicle 1 from an assumed-known start position, such as the assumed start point of a bend.

At this point, analysis unit 15 determines the deviation between the pattern of each space-dependent dynamic characteristic along the current road section, and a mean pattern (or normal, i.e. acceptable, statistical anomaly distribution) of the same space-dependent dynamic characteristic along the same or similar road section, determined in previous runs by vehicle 1 and stored in a history memory 17 of analysis unit 15.

If the deviations, in absolute or percentage value (or statistical variance value along the current road section), of all the dynamic characteristics are below respective normal thresholds (each expressed in absolute or percentage value or in statistical variance value along the current road section), the driver's behaviour along the current road section is considered normal. Conversely, if the deviation, in absolute or percentage value (or statistical variance value along the current road section), of at least one dynamic characteristic is above an abnormal threshold, the driver's behaviour along the current road section is considered abnormal (at least with respect to a profile of what is normal for the driver). The normal threshold of each dynamic characteristic may coincide with the abnormal threshold, or may be lower than the abnormal threshold to define a "grey" area in which no definite driver behaviour can be determined. It is important to note that not all dynamic characteristics are equally significant in determining driver behaviour; some may be more significant than others.

Once enough data about successive runs in the same direction along the current or a similar road section is acquired, the behaviour of the driver along the current road section can be assessed. If the driver's behaviour along the current road section is determined abnormal, the space-dependent dynamic characteristic patterns along the current road section are not used to update, in history memory 17, the mean patterns and statistical distributions of the space-dependent dynamic characteristics along the same or a similar road section. Conversely, if the driver's behaviour along the current road section is determined normal, the space-dependent dynamic characteristic patterns along the current road section are used to update, in history memory 17, the mean patterns and statistical distributions of the space-dependent dynamic characteristics along the same or a similar road section. The dynamic characteristic mean patterns and statistical distributions stored in history memory 17, and which form a normal driver behaviour reference, are thus constantly updated.

It is important to note that, if history memory 17 contains no mean patterns or statistical distributions of the space-dependent dynamic characteristics along the same or a similar road section (i.e. if the vehicle is travelling along the current road section for the first time), then no assessment can be made of the driver's behaviour. The space-dependent dynamic characteristic patterns, however, are still memorized in history memory 17 for use later as the first of a basic set of statistical data concerning the driver's behaviour along the current road section.

Once analysis of the current road section as described above is completed, analysis unit 15 deletes the current road section data from buffer memory 16, and begins analysing the next road section. In other words, the process is performed cyclically, identifying and analysing a road section at each cycle.

Figure 4:
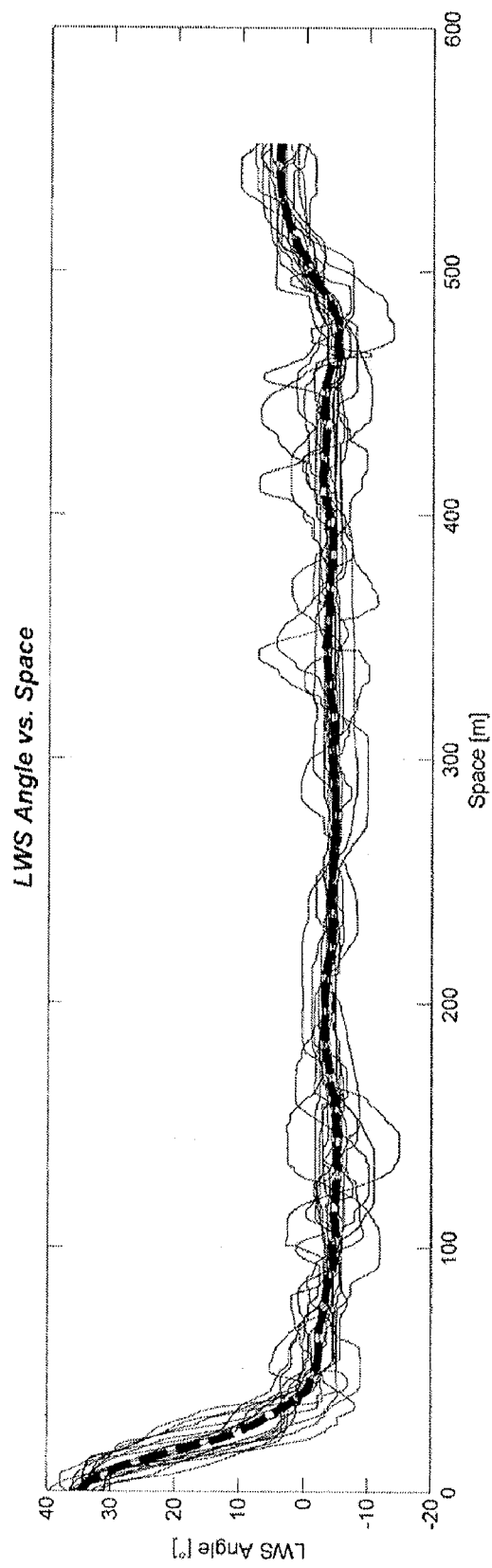
FIGS. 4-7 show graphs of space-dependent test patterns of two dynamic characteristics of the vehicle when travelling in a straight line and cornering.
Figure 5:
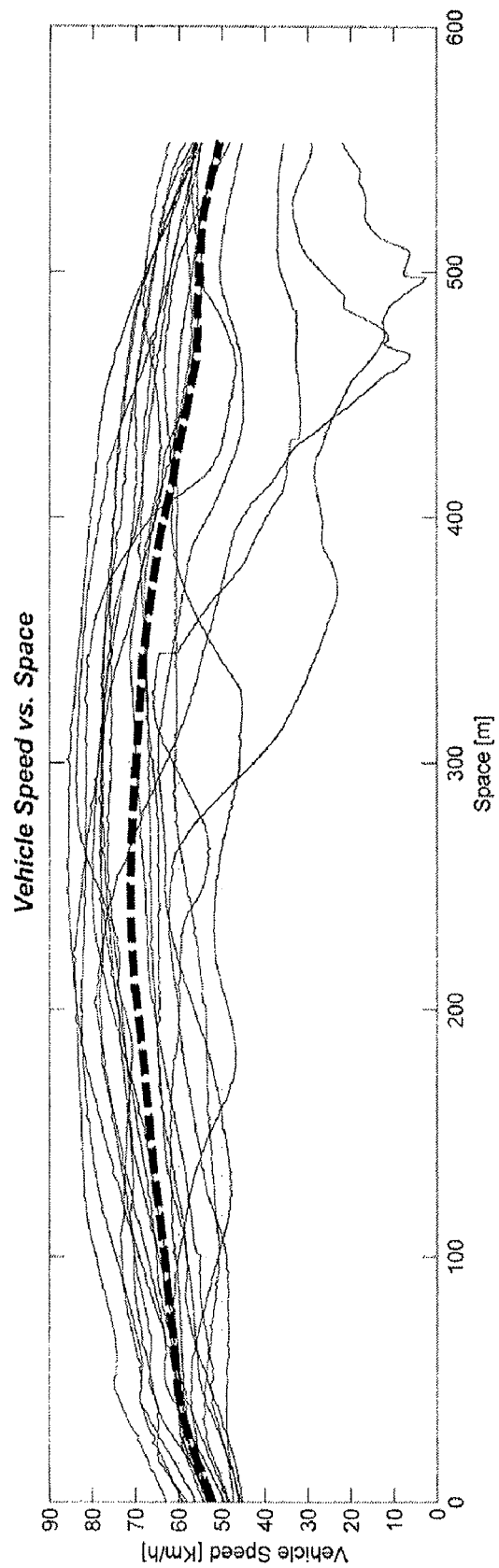
Figure 6:
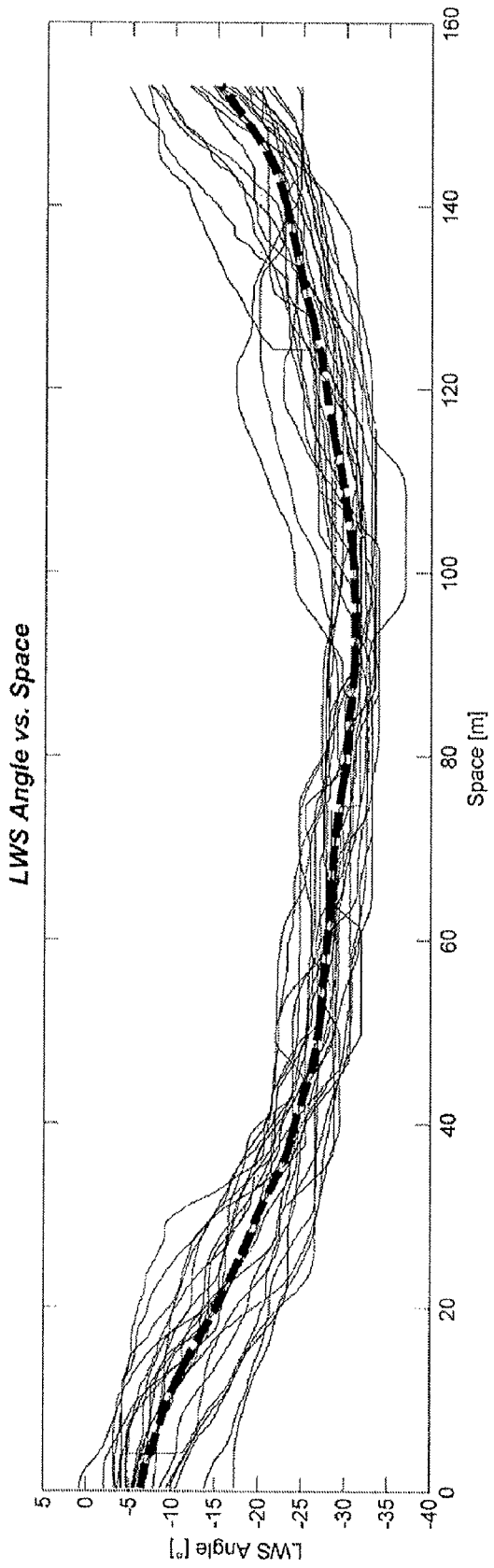
Figure 7:
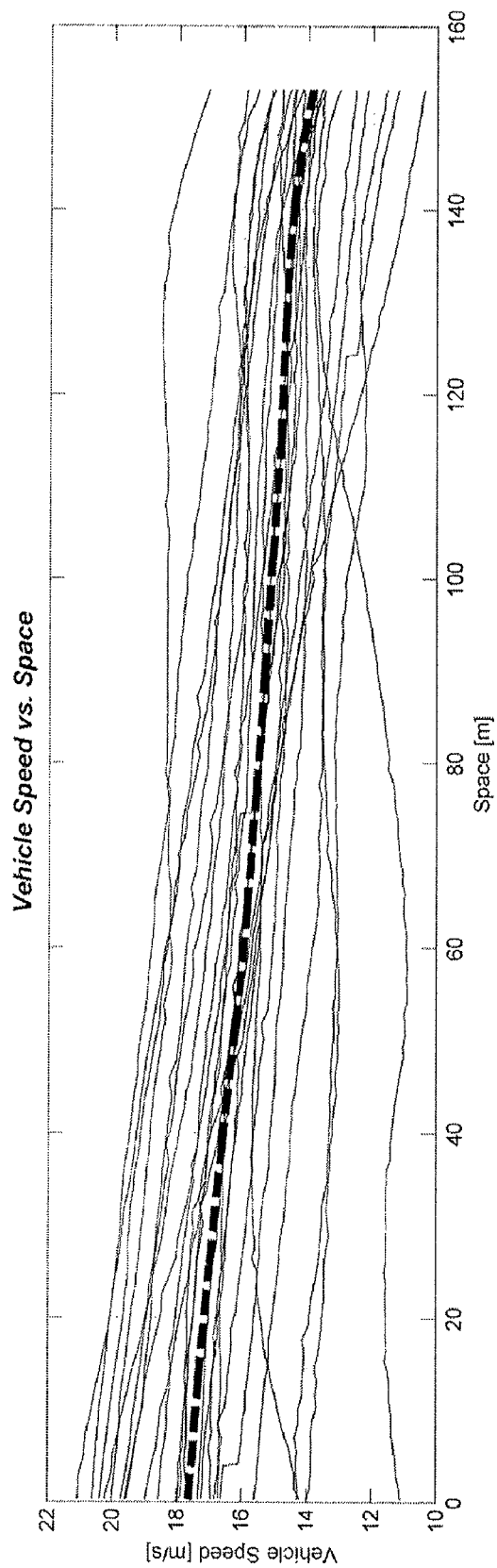

By way of example, FIGS. 4-7 show two graphs of space-dependent test patterns of two dynamic characteristics of vehicle 1 when travelling in a straight line and cornering. In each graph, the thin continuous lines indicate the test data, and the bold dash line indicates the mean pattern obtained as the arithmetic mean of the test data. FIG. 4 shows the space-dependent pattern of the steering angle of vehicle 1 travelling in a straight line; FIG. 5 shows the space-dependent pattern of the longitudinal speed of vehicle 1 travelling in the same straight line; FIG. 6 shows the space-dependent pattern of the steering angle of vehicle 1 travelling around a bend; and FIG. 7 shows the space-dependent pattern of the longitudinal speed of vehicle 1 travelling around the same bend.

In a preferred embodiment, the normal and abnormal thresholds vary according to the confidence level of the mean dynamic characteristic patterns stored in history memory 17. More specifically, the higher the confidence level is, the lower the normal and abnormal threshold are. The confidence level of the mean dynamic characteristic patterns stored in history memory 17 depends directly on the amount of data put into determining the mean pattern (i.e. the mean of a hundred values is undoubtedly more stable and dependable than that of two values).

In a preferred embodiment, all other conditions being the same, the normal and abnormal thresholds are lower when comparing the same road section, and are higher when comparing two similar road sections.

Two road sections are considered identical (i.e. substantially the same road section) when the distance between the respective start and end points of the two road sections is below a given threshold (e.g. of 6-12 metres). And two road sections are considered similar when the directional dynamic characteristic pattern remains within the same given range along both road sections, and when the speed or longitudinal acceleration/deceleration of vehicle 1 remains within the same given range along both road sections. For example, a straight road section travelled at a constant speed of 45 km/h may be considered similar to another straight road section travelled at a constant speed of 50 km/h, but can never be considered similar to a straight road section travelled at a constant speed of 120 km/h, or a straight road section travelled at increasing speed from 30 to 60 km/h (i.e. in acceleration).

Analysis unit 15 preferably interpolates the space-dependent dynamic characteristic pattern along the current road section, so that all the elements of the dynamic characteristic along the current road section assume values at the same points in space as the mean pattern, stored in history memory 17, of the space-dependent dynamic characteristic along the same or a similar road section, so analysis unit 15 can make a point-by-point comparison between the space-dependent dynamic characteristic pattern along the current road section, and the mean pattern of the space-dependent dynamic characteristic along the same or a similar road section.

Figure 2:
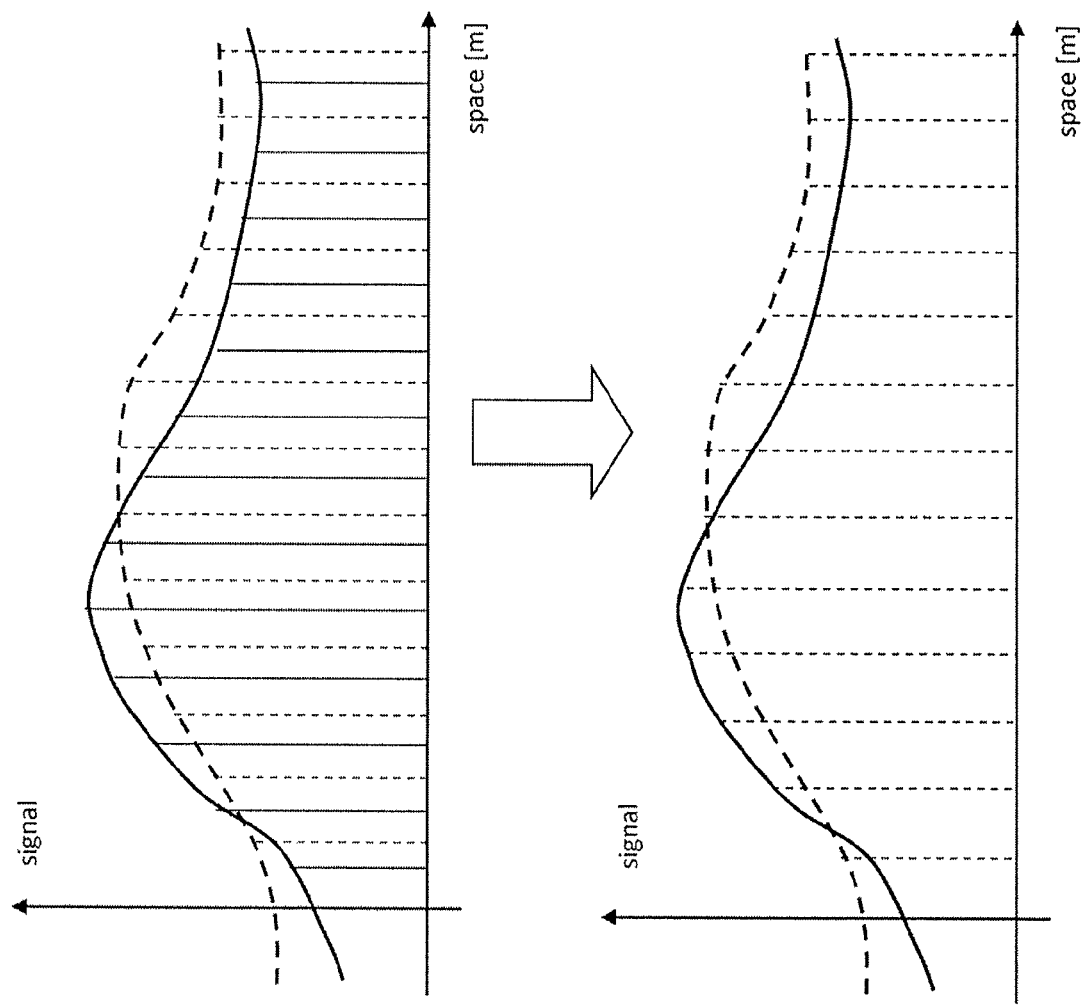
FIG. 2 shows a graph illustrating interpolation of a space-dependent pattern of a dynamic characteristic of the vehicle.

This is shown by way of example in FIG. 2. Initially (top graph), the dynamic characteristic signal along the current road section is referred to different space values from the dynamic characteristic mean pattern signal, and, by interpolation, all the elements of the two signals are made to assume values at the same points in space.

Figure 3:
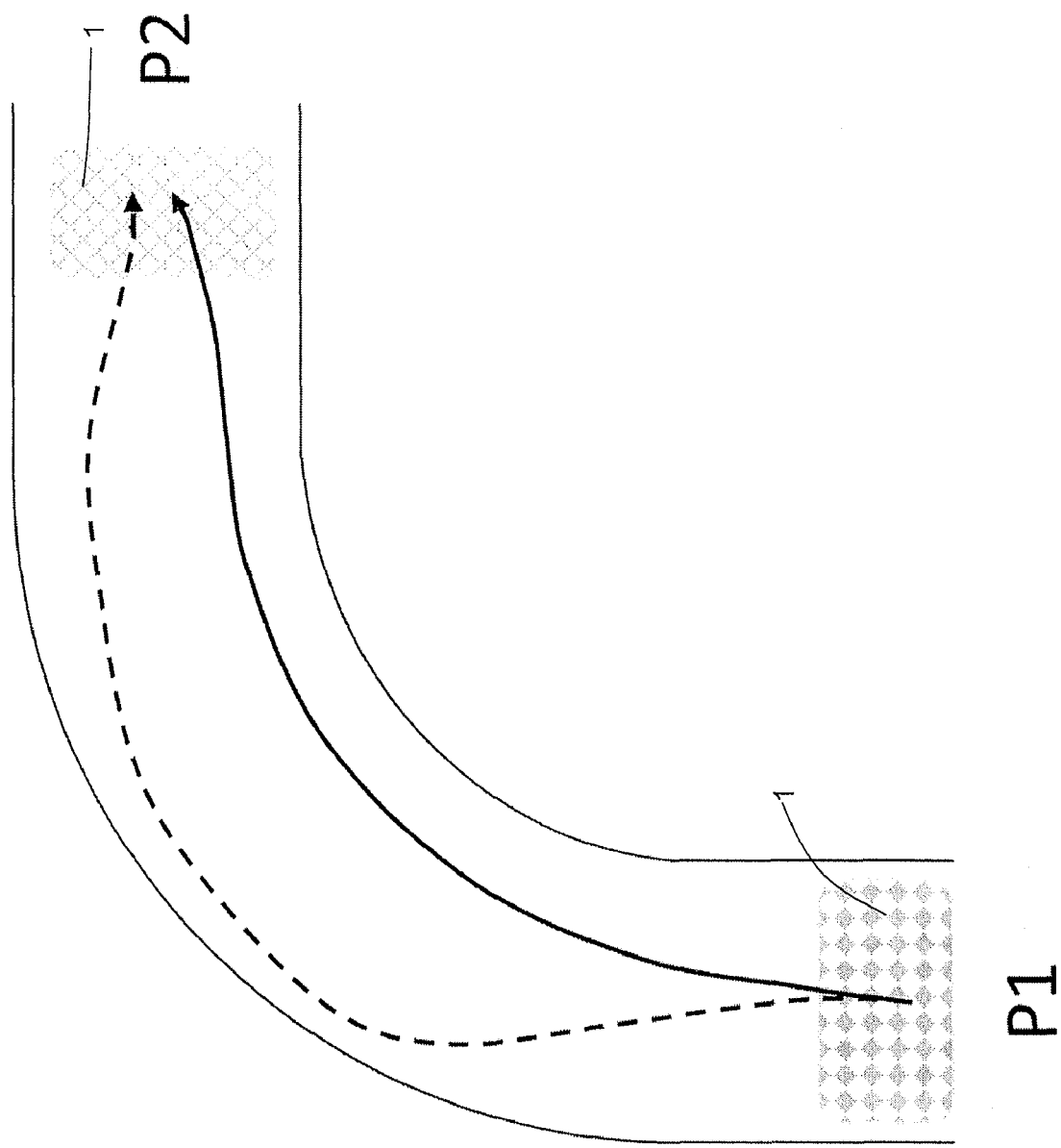
FIG. 3 shows a schematic of two possible vehicle paths between the same start and end points.

The space-dependent dynamic characteristic pattern along the current road section is not normally, exactly the same length in space as the mean pattern, determined in previous runs of vehicle 1 and stored in history memory 17, of the space-dependent dynamic characteristic along the same or a similar road section. Even when dealing with the same road section, the path travelled by the vehicle is never exactly the same, so the distance travelled between the same start and end points varies (as shown in FIG. 3, which shows two different paths of vehicle 1 between the same start point P1 and end point P2). To make a point-by-point comparison, analysis unit 15 therefore determines the minimum common length of the two patterns, and disregards the values outside it.

In a preferred embodiment, analysis unit 15 determines a mean deviation value time trend to identify a positive trend towards more normal driving behaviour (i.e. smaller deviations), or a negative trend towards more abnormal driving behaviour (i.e. larger deviations).

Assuming history memory 17 contains mean patterns and standard deviations (i.e. a known distribution) of dynamic characteristics at (or between) the start and end points of a road section identical or similar to the current one, abnormal driving can be measured using the following method, described by way of a non-limiting example.

A road section is driven along abnormally, when the instantaneous values of the dynamic characteristics (e.g. speed, longitudinal and lateral acceleration) at the start and end points fall outside their respective ranges, i.e. when the instantaneous values of each dynamic characteristic recorded at (or between) the start and end points do not fall within the range $[\mu-n1\sigma, \mu+n2\sigma]$, where $\mu$ is the "historic" mean value (stored in the history memory), $\sigma$ is the "historic" standard deviation, and n1 and n2 are two known numbers.

In another non-limiting example, a road section is driven along abnormally, when, between the start and end points of the current road section, or over a given distance travelled after the start point of the last road section travelled (e.g. a long straight road section, such as a motorway, along which the vehicle is travelling), or over a given distance travelled before crossing the end point of the last road section travelled (e.g. a long straight road section, such as a motorway, from which the vehicle has just turned off), one or more of the above dynamic characteristics manifest pattern anomalies characterized by statistical values, e.g. number and amplitude of oscillations, above given thresholds (stored in the history memory), or thresholds calculated on the basis of previous vehicle runs along the same or a similar road section.

Current driving behaviour is classified as abnormal when the number of road sections driven along abnormally in the last time and/or space interval (of known duration and length) exceeds a given threshold.

In one embodiment, analysis unit 15 determines at least one performance index as a function of the recent dynamic characteristic pattern and independently of the instantaneous position of vehicle 1. The performance index may be correlated with the variation in normal driving behaviour, or may be used to more accurately identify abnormal driver behaviour, i.e. abnormal driver behaviour is also identified as a function of the performance index, which serves as further confirmation.

By way of a non-limiting example, the performance index may be calculated as the weighted sum of synthetic parameters extracted from the recent pattern of at least one dynamic characteristic. For example, the performance index may take into account the variation in the fundamental harmonic component of the steering angle signal, caused by driver control of the steering wheel, and which is determined by performing a Fourier transform of the signal, filtering the signal of spurious components (i.e. not caused by driver control), and analysing the time pattern of the resulting fundamental component. The performance index may also take into account the variation in the steering angle signal caused by sharp corrections to the vehicle path. Such corrections are associated with erratic driving: the driver, when cornering or to keep the vehicle straight, being forced to make sharp corrections to the vehicle path to avoid running off the road and/or hitting other vehicles and/or obstacles in the vehicle's path. This variation is calculated as the difference between the instantaneous value and the mean value of the steering angle signal obtained from a movable-mean filter (or, more generally, a low-pass filter) that supplies the mean signal value in a given known time interval. If the difference signal (or the integral of the absolute difference value calculated with respect to a given time or space interval, e.g. between the start and end points of the current road section or the final kilometres travelled by the vehicle) exceeds a given threshold, abnormal driving behaviour associated with a sharp path correction is determined.

In a preferred embodiment, analysis unit 15 memorizes the sequence of classified road sections in a "source-destination" structure in history memory 17. So, once the current road section is classified at least once, analysis unit 15 can determine from the "source-destination" structure the next road section most likely to follow the current one. Analysis unit 15 also determines whether or not the current motion status of vehicle 1 is compatible with negotiating the next road section, and, if it is not compatible, alerts the driver to a potential hazard situation. More specifically, analysis unit 15 determines a mean crossover speed to the next road section, by determining a mean speed at the start point of the next road section; determines the acceleration/deceleration necessary to reach the mean crossover speed smoothly by the start point of the next road section; and judges the current motion status of vehicle 1 incompatible with negotiating the next road section, if the acceleration/deceleration required is above a given threshold, or if the difference between the acceleration/deceleration required and the mean acceleration/deceleration along the current road section exceeds a given threshold.

In one embodiment, when abnormal driver behaviour is determined, or the motion status of the vehicle is determined incompatible with negotiating the next road section, analysis unit 15 commands an electronic central control unit 18 of engine 5 and/or an electronic central attitude control unit 19 to make a safety modification to the performance of vehicle 1 (e.g. to slow down vehicle 1 by reducing torque, if vehicle 1 is going too fast, or to stiffen the suspensions to improve road-holding when cornering).

The vehicle driver behaviour analysis method described has numerous advantages.

First and foremost, it is cheap and easy to implement on a modern road vehicle, by only employing information already present in the vehicle's CAN (Car Area Network). Moreover, it does not require much computing power or a large memory capacity (even the most extensive embodiment only calls for a "source-destination" structure and associating the dynamic characteristics of respective road sections with statistical historic data), which means it can operate perfectly even using low-cost commercial hardware.

The analysis method described employs no geographic reference maps, which means no periodic updating is required, and the method is unaffected by inevitable map errors. Digital maps, in fact, are known to be affected by reference errors and unpredictable factors (such as detours caused by prolonged roadworks) resulting in discrepancies between real and mapped routes.

Last but not least, the analysis method described provides for safely and reliably identifying any abnormal driver behaviour, i.e. driving behaviour differing significantly from the driver's usual style, both in general terms and with respect to location, route, and specific driving direction. More specifically, the method provides for constructing a personal driving history representing what is considered "usual" driving behaviour. And any significant deviation from the driver's usual behaviour is considered "abnormal", i.e. unusual, for the driver, even without the anomaly being classified beforehand. Reliability of the diagnostic system as a whole is also ensured by parallel use of one or more signal analysis methods, independent of the georeference system, which take into account recent signal history in terms of space and/or time, and may, for example, comprise main harmonic component analysis, threshold crossover analysis (in terms of amount, frequency, and interval between two successive crossovers), and analysis of the difference between instantaneous values and movable-mean or low-pass filter values.

The invention claimed is:

1. A road vehicle (1) driver behaviour analysis method, the analysis method comprising the steps of:
    determining and memorizing an instantaneous position of the vehicle (1) expressed in geographic coordinates;
    determining and memorizing at least one dynamic characteristic characterizing motion of the vehicle (1);
    classifying a current road section just travelled by the vehicle (1) and defined by a start point and an end point having respective geographic coordinates;
    determining a space-dependent pattern of the dynamic characteristic along and from the start point to the end point of the current road section;
    determining a deviation between the space-dependent pattern of the dynamic characteristic along the current road section, and a space-dependent mean pattern or statistical distribution of the dynamic characteristic along the same or a similar road section and determined in previous runs of the vehicle (1);
    updating, only using the space-dependent pattern of the dynamic characteristic along the current road section, the space-dependent mean pattern or statistical distribution of the dynamic characteristic along the same or similar road section, if an absolute value of the deviation is below a first threshold; and
    identifying anomalous driver behaviour, and not using the space-dependent pattern of the dynamic characteristic along the current road section to update the space-dependent mean pattern or statistical distribution of the dynamic characteristic along the same or similar road section, if the absolute value of the deviation is above a second threshold;
    wherein an analysis unit is utilized to perform at least the classifying, determining the space-dependent pattern, determining a deviation, updating and identifying steps.

2. An analysis method as claimed in claim 1, and comprising the further step of classifying the current road section as a function of a pattern of at least one directional dynamic characteristic of the vehicle (1), defined by a steering angle of the vehicle (1), a yaw angle of the vehicle (1), or a lateral acceleration of the vehicle (1).

3. An analysis method as claimed in claim 2, and comprising the further steps of:
    classifying the current road section as a straight, if the absolute value of the directional dynamic characteristic remains below a third threshold along the whole of the current road section; and
    classifying the current road section as a curve, if the absolute value of the directional dynamic characteristic remains above a fourth threshold along the whole of the current road section.

4. An analysis method as claimed in claim 2, and comprising the further step of only classifying the current road section if the pattern of the directional dynamic characteristic remains within a given range for a travelled space above a fifth threshold; otherwise the current road section is eliminated with no further analysis, on the grounds of not being sufficiently stable.

5. An analysis method as claimed in claim 2, and comprising the further step of considering two road sections similar if, along both road sections, the pattern of the directional dynamic characteristic remains within the same given range, and if, along both road sections, the speed of the vehicle (1) or longitudinal acceleration/deceleration of the vehicle (1) remains within the same given range.

6. An analysis method as claimed in claim 1, and comprising the further step of considering two road sections identical if the distance between the respective start and end points of the two road sections is below a sixth threshold.

7. An analysis method as claimed in claim 1, wherein the step of determining a deviation comprises the further steps of:
    interpolating the space-dependent pattern of the dynamic characteristic along the current road section, so that all the elements of the dynamic characteristic along the current road section assume values at the same points in space as the space-dependent mean pattern or statistical distribution of the dynamic characteristic along the same or similar road section and determined in previous runs of the vehicle (1); and
    making a point-by-point comparison of the space-dependent pattern of the dynamic characteristic along the current road section, and the space-dependent mean pattern or statistical distribution of the dynamic characteristic along the same or similar road section and determined in previous runs of the vehicle (1).

8. An analysis method as claimed in claim 1, and comprising the further steps of:
    determining as a function of time and memorizing the instantaneous position of the vehicle (1) expressed in geographic coordinates;
    determining as a function of time and memorizing at least the dynamic characteristic characterizing motion of the vehicle (1); and
    subsequently converting a space-dependent dynamic characteristic by combining a time-dependent dynamic characteristic with a time-dependent instantaneous position of the vehicle (1) expressed in geographic coordinates.

9. An analysis method as claimed in claim 1, wherein the dynamic characteristic characterizing motion of the vehicle (1) is defined by a steering angle of the vehicle (1), a rate of change in the steering angle of the vehicle (1), a yaw angle of the vehicle (1), a rate of change in the yaw angle of the vehicle (1), a lateral acceleration of the vehicle (1), a longitudinal acceleration of the vehicle (1), a speed of the vehicle (1), a rotation speed of individual wheels (2, 3) of the vehicle (1), or a hydraulic pressure of the brake circuit of the vehicle (1).

10. An analysis method as claimed in claim 1, and comprising the further step of determining a time trend in mean deviation values, to identify a positive trend towards more normal driving behaviour, or a negative trend towards less normal driving behaviour.

11. An analysis method as claimed in claim 10, and comprising the further steps of:
    determining at least one performance index as a function of the recent dynamic characteristic pattern and independently of the instantaneous position of the vehicle (1); and
    correlating a change in driving behaviour with the performance index.

12. An analysis method as claimed in claim 1, and comprising the further steps of:
    determining at least one performance index as a function of the recent dynamic characteristic pattern and independently of the instantaneous position of the vehicle (1); and
    also identifying anomalous driver behaviour as a function of the performance index.

13. An analysis method as claimed in claim 1, and comprising the further steps of:
    memorizing the sequence of classified road sections in a "source-destination" structure;
    determining from the "source-destination" structure a next road section after the current road section;
    determining whether or not a current motion status of the vehicle (1) is compatible with negotiating the next road section; and
    alerting the driver or an electronic central control unit (18, 19) of the vehicle (1) to a potential hazard situation, if the current motion status of the vehicle (1) is incompatible with negotiating the next road section.

14. An analysis method as claimed in claim 13, and comprising the further steps of:
    determining a mean crossover speed to the next road section, by determining a mean speed at the start point of the next road section;
    determining an acceleration/deceleration necessary to reach the mean crossover speed to the next road section smoothly by the start point of the next road section; and
    judging the current motion status of the vehicle (1) incompatible with negotiating the next road section, if the acceleration/deceleration required is above a seventh threshold, or if a difference between the acceleration/deceleration required and a mean acceleration/deceleration along the current road section is above an eighth threshold.

* * * * *